INVENTOR.
Joseph F. McCormick
BY
ATTORNEYS

United States Patent Office 3,524,474
Patented Aug. 18, 1970

3,524,474
SERVO-VALVE WITH CERAMIC FORCE MOTOR
Joseph F. McCormick, Hingham, Mass., assignor to Delta Hydraulics Company, Braintree, Mass., a corporation of Massachusetts
Filed Oct. 12, 1967, Ser. No. 674,975
Int. Cl. F16k *11/02, 11/24*
U.S. Cl. 137—625.61                                4 Claims

ABSTRACT OF THE DISCLOSURE

A servo-valve having a ceramic bimorph mounted about its periphery and serving as a force motor to control a spool valve and extend the linear range of the device. An hydraulic transformer in the form of ratioed bellows may convert the very small displacement of the bimorph to a larger displacement at the spool valve either directly or indirectly through a flapper valve assembly.

---

Figure 1:
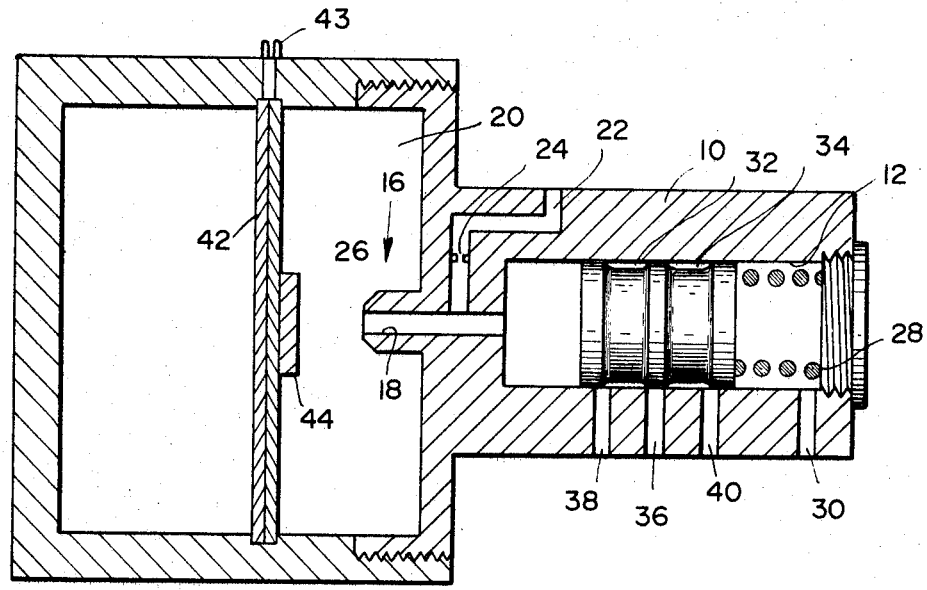

This invention relates to servo-valves and more particularly comprises a new and improved valve having a ceramic force motor.

One object of this invention is to increase the linear range of servo-valves having electrically energized force motors.

Another object of this invention is to provide a force motor for servo-valves, which has an extremely small but linear displacement.

Yet another object of this invention is to provide means for converting small linear displacements of a force motor in a servo-valve to larger mechanical displacements which are capable of controlling a spool of a servo-valve.

To accomplish these and other objects, in accordance with one embodiment of this invention, a ceramic bimorph is provided in the valve for either directly or indirectly controlling the spool. The bimorph may either be mechanically linked to the spool or may be operatively linked to the spool indirectly through such devices as a pilot valve. In accordance with one embodiment of this invention, the bimorph is linked to the spool through a hydraulic transformer in the form of ratioed bellows.

Figure 2:
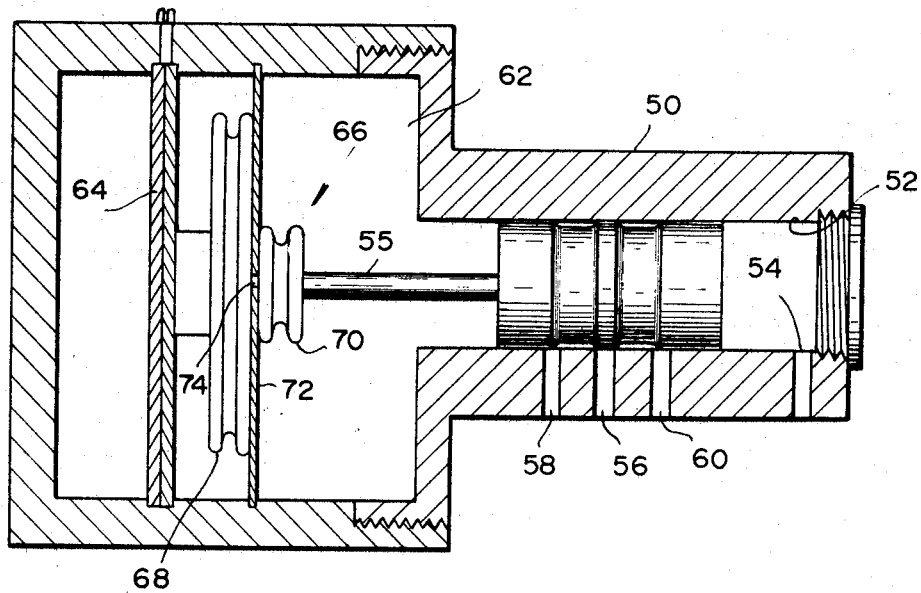

In the drawing:

FIG. 1 is a cross sectional view of one embodiment of servo-valve embodying this invention; and FIG. 2 is a cross sectional view of another embodiment of servo-valve constructed in accordance with this invention.

The embodiment of this invention shown in FIG. 1 is incorporated into a casing 10 having a central bore 12 within which is arranged a spool 14 movable axially in the bore. The position of the spool 14 in the bore 12 is controlled on the left side by a pilot 16 which includes a passage 18 open at its right end in the bore 12 and at its left end in the chamber 20. The passage 18 is fed by a supply pressure passage 22 having a fixed orifice 24. Control fluid fed through the passage 22 flows to the passage 18 and is discharged at the variable orifice 26 into the chamber 20 and into the bore 12 at the left end of the spool 14. The pressure exerted on the spool 14 by the fluid from the passage 18 is counteracted by a spring 28 disposed at the right end of the bore 12. In place of the spring 28, biasing pressure may be introduced on the right side of the spool 14 through a passage 30 provided in the casing and communicating with the bore to the right of the spool for that purpose.

The spool 14 has a pair of annular recesses 32 and 34 which are respectively adapted to connect the inlet port 36 with one or the other of the discharge ports 38 and 40. It is evident that when the spool is moved to the right as shown in FIG. 1 the annular groove 32 will connect the inlet 36 to the discharge post 38, and when the spool is moved to the left as viewed in that figure the annular recess 34 will connect the inlet 36 to the discharge port 40.

As in conventional spool-type valves, the position of the spool 14 is controlled by the pilot pressure exerted against the left end of the spool in the bore 12. This pressure in turn is controlled by the size of the orifice 26 of the pilot 16. Ordinarily the supply pressure conducted through the passage 22 is of constant value, and the pressure exerted on the spool is controlled by varying the size of the orifice 26. In accordance with the present invention, the size of the orifice 26 is controlled by a piezo-electric ceramic bimorph 42.

The ceramic bimorph 42 has many advantages over other forms of force motors used to control the flapper valves of servo-valves. The displacement of the central portion of a bimorph may be in the order of .0001 inch, and they have a natural finite frequency which is an order of magnitude greater than the natural frequency of conventional types of dynamic force motors having movable coils. The higher natural frequency provides an increased linear range for the instrument which results in an increase in the bandwidth of the system, and the increase in the band width is at least at full order of magnitude.

The bimorph may be energized through terminals 43. In the embodiment of FIG. 1, the mechanical displacement of the flapper valve 44 carried by the bimporph 42 results in a proportional area change in the flapper valve orifice 26. This orifice change in turn results in either an increase or decrease in the flow rate depending on the polarity of the ceramic displacement, and the orifice change is reflected in either an increase or decrease in the pressure exerted against the left end of spool 14. This change in pressure in turn is utilized to control the mechanical displacement of the spool.

As indicated above, the displacement of the ceramic bimorph 42 normally is in the range of .0001 inch, and it is usually desirable that the shift of spool from the neutral position be in the order of .003 to .010 inch. To achieve the step up in displacement of the spool, the embodiment of this invention shown in FIG. 2 may be employed. In FIG. 2, the spool valve shown includes a casing 50 having a cylindrical bore 52 within which is disposed axially movable spool 54. The spool 54 may be identical to the spool 14 shown in the first embodiment and is used to connect the inlet passage 56 to either of the discharge passages 58 and 60.

Disposed in the large chamber 62 is the piezo-electric ceramic bimorph 64 which is used to control the position of spool 54. This control may either be achieved directly by a mechanical connection to the spool as shown in FIG. 2 (see pin 55) or indirectly by controlling a flapper valve in accordance with the embodiment of FIG. 1. The control, whether it be direct or indirect, is provided through a bellows-type mechanical transformer 66 disposed in chamber 62 between the spool 54 and bimorph 64.

The bellows transformer 66 is shown to include a larger bellows 68 and a smaller bellows 70. The bellows 68 and 70 are connected by a disc 72 which is rigidly fixed within the chamber 62, and a passage 74 in the disc 70 places the interiors of the bellows in communication with one another. The bellows are filled with fluid, and compression of the bellows 68 by the bimorph 64 results in an elongation of the bellows 70, and the ratio of the displacement between the left end of bellows 68 and the right end of bellows 70 is proportional to the ratios of the cross sectional areas of the two bellows. This ratio, of course, is in turn proportional to the square of the radii of the bellows. Thus, if the radius of the larger bellows 68 is five times the radius of the smaller bellows 70, each unit displacement of the bimorph 64 will result in 25 units of displacement of the right end of bellows 70. If the bellows 70 is connected directly to the spool 54, as by strut 55, a displacement of .0001 inch of the bimorph may result in a displacement of .0025 inch for the spool. It is apparent that the ratio of the radii may be as large as is necessary to convert the bimorph displacement to a displacement for the spool within the operative range. Thus, the relatively small mechanical displacement of the bimorph is transformed to a much larger mechanical displacement of the spool by the ratio of the bellows assemblies.

From the foregoing description it is apparent that the use of the bimorph enabled the changing amplitude and polarity of an electrical input signal to a force motor to be converted to a proportional hydraulic flow, and this proportional flow may control the final output element of the servo-valve which in turn may be linked to and control machine tools, computer drive assemblies, steering mechanisms etc. It is also apparent that the very high natural frequency of the bimorph markedly increases the linear range of the device.

What is claimed is:

1. A servo-valve comprising a casing with a bore and a spool valve moveable in the bore, a ceramic bimorph attached substantially about its full periphery to the casing and with its central portion capable of displacing in the casing and means for impressing an electrical signal on the bimorph to control the position of said central portion, and means connected to and moveable with the central portion of the bimorph and operatively connected to the spool causing displacement of the central portion in response to energization of the bimorph to displace the spool, the last-recited means including a pilot with an orifice coaxial with the bimorph and a flapper valve aligned axially with the orifice, said flapper valve being mounted on the central portion of the bimorph and displacing axially therewith toward and away from the orifice to alter the orifice size, and means in the casing for directing fluid under pressure to the pilot with the pressure exerted on one side of the spool being controlled by the orifice size in turn controlled by the position of the flapper valve.

2. A servo-valve as described in claim 1 further characterized by said central portion of the bimorph being displaceable in the order of .0001 inch.

3. A servo-valve comprising a casing with a bore and a spool valve moveable in the bore, a ceramic bimorph attached substantially about its full periphery to the casing and with its central portion capable of displacing in the casing and means for impressing an electrical signal on the bimorph to control the position of said central portion, and means connected to and moveable with the central portion of the bimorph and operatively connected to the spool causing displacement of the central portion in response to energization of the bimorph to displace the spool, the last-recited means including a hydraulic transformer in the form of a multi-stage member coaxial with the bimorph and with the stages of different diameter and with its end of larger diameter connected to the central portion of the bimorph and with its end of smaller diameter controlling the position of the spool valve for increasing the spool displacement with respect to the bimorph displacement.

4. A servo-valve as described in claim 3 further characterized by the smaller diameter end of the hydraulic transformer being coaxial with and mechanically connected to the spool.

References Cited

UNITED STATES PATENTS

| 2,635,637 | 4/1953 | Karrer | 251—57 |
| 2,928,409 | 3/1960 | Johnson et al. | 137—82 |
| 3,152,612 | 10/1964 | Avery | 251—141 XR |
| 3,360,664 | 12/1967 | Straube | 310—9.1 XR |

FOREIGN PATENTS 468,320  11/1928  Germany.

HENRY T. KLINKSIEK, Primary Examiner

U.S. Cl. X.R.

91—47; 92—38; 137—625.64; 251—57, 129; 310—8.1, 8.5